US012367200B2

United States Patent
Canim et al.

(10) Patent No.: US 12,367,200 B2
(45) Date of Patent: Jul. 22, 2025

(54) RANKING IMAGE SOURCES FOR TRANSFER LEARNING

(71) Applicant: International Business Machines Corporation, Armonk, NY (US)

(72) Inventors: Mustafa Canim, Ossining, NY (US); Bishwaranjan Bhattacharjee, Yorktown Heights, NY (US); Alfio Massimiliano Gliozzo, Brooklyn, NY (US)

(73) Assignee: International Business Machines Corporation, Armonk, NY (US)

( * ) Notice: Subject to any disclaimer, the term of this patent is extended or adjusted under 35 U.S.C. 154(b) by 729 days.

(21) Appl. No.: 16/668,252

(22) Filed: Oct. 30, 2019

(65) Prior Publication Data

US 2021/0133596 A1 May 6, 2021

(51) Int. Cl.
*G06F 16/242* (2019.01)
*G06F 16/2457* (2019.01)
*G06N 5/022* (2023.01)

(52) U.S. Cl.
CPC .... *G06F 16/24578* (2019.01); *G06F 16/2438* (2019.01)

(58) Field of Classification Search
CPC .............. G06F 16/2438; G06F 16/24578
See application file for complete search history.

(56) References Cited

U.S. PATENT DOCUMENTS

| 7,092,966 | B2 * | 8/2006 | McIntyre | G06T 11/60 |
| | | | | 707/E17.02 |
| 8,027,940 | B2 * | 9/2011 | Li | G06Q 30/02 |
| | | | | 706/12 |
| 8,326,091 | B1 * | 12/2012 | Jing | G06K 9/6224 |
| | | | | 382/311 |
| 8,429,176 | B2 * | 4/2013 | Sigurbjornsson | G06F 16/00 |
| | | | | 707/765 |
| 8,503,791 | B2 * | 8/2013 | Conwell | H04N 5/23219 |
| | | | | 707/731 |
| 8,924,313 | B2 | 12/2014 | Chidlovskii | |

(Continued)

FOREIGN PATENT DOCUMENTS

| CN | 102881019 A | 1/2013 |
| CN | 106951470 A | 7/2017 |

(Continued)

OTHER PUBLICATIONS

Wang, Zhigang, et al. "XLore: A Large-scale English-Chinese Bilingual Knowledge Graph." ISWC (Posters & Demos). 2013. pp. 1-4.

(Continued)

*Primary Examiner* — Miranda Le
(74) *Attorney, Agent, or Firm* — Patterson + Sheridan, LLP

(57) ABSTRACT

A system for ranking machine learning base models for transfer learning purposes is described. The system receives image data in the form an image or an image set and extracts image tags from the images. The image tags are expanded into a set of associated terms using a word embedding database and model. The associated terms are used to query a knowledge database for parent or categorical terms used to rank various matching machine learning base models that may be improved or trained by the image data.

20 Claims, 5 Drawing Sheets

(56) References Cited

U.S. PATENT DOCUMENTS

| | | | |
|---|---|---|---|
| 9,146,941 | B2 | 9/2015 | Lin et al. |
| 9,177,050 | B2* | 11/2015 | Lu .......................... G06F 16/38 |
| 9,183,226 | B2* | 11/2015 | Yee ..................... G06F 16/5846 |
| 9,311,609 | B2 | 4/2016 | Marcheret |
| 9,607,014 | B2 | 3/2017 | Wang et al. |
| 9,678,993 | B2* | 6/2017 | Hohwald ............ G06F 16/5866 |
| 9,773,156 | B2* | 9/2017 | Chan ...................... G06V 20/30 |
| 9,792,530 | B1* | 10/2017 | Wu ......................... G06F 18/40 |
| 9,875,736 | B2 | 1/2018 | Kim et al. |
| 10,216,766 | B2 | 2/2019 | Lin et al. |
| 10,235,623 | B2* | 3/2019 | Lin ....................... G06F 16/583 |
| 10,356,027 | B2* | 7/2019 | Garcia ................... G06Q 30/06 |
| 10,521,469 | B2* | 12/2019 | Qiu ..................... G06F 16/9024 |
| 10,579,907 | B1* | 3/2020 | Kim ..................... G06V 10/764 |
| 10,769,191 | B2* | 9/2020 | Corrado .................. G06F 16/35 |
| 10,783,393 | B2* | 9/2020 | Molchanov .......... G06V 40/174 |
| 10,860,898 | B2* | 12/2020 | Yang ..................... G06V 10/462 |
| 10,891,485 | B2* | 1/2021 | Anorga ................. G06V 30/413 |
| 11,270,160 | B2* | 3/2022 | Jiang ....................... G06N 3/044 |
| 11,494,616 | B2* | 11/2022 | Guo ........................ G06N 3/045 |
| 11,704,487 | B2* | 7/2023 | Yang ................... G06F 18/2155 |
| | | | 706/12 |
| 2009/0141969 | A1 | 6/2009 | Yu et al. |
| 2010/0011025 | A1 | 1/2010 | Zheng et al. |
| 2011/0035350 | A1* | 2/2011 | Zwol ..................... G06F 40/169 |
| | | | 706/54 |
| 2011/0320387 | A1 | 12/2011 | He et al. |
| 2012/0158633 | A1 | 6/2012 | Eder |
| 2012/0221572 | A1* | 8/2012 | Wang ................... G06F 16/5838 |
| | | | 707/E17.084 |
| 2012/0259801 | A1 | 10/2012 | Ji et al. |
| 2012/0269436 | A1* | 10/2012 | Mensink .............. G06V 10/764 |
| | | | 382/180 |
| 2013/0013591 | A1* | 1/2013 | Hu .......................... G06F 16/58 |
| | | | 707/723 |
| 2013/0262449 | A1 | 10/2013 | Arroyo et al. |
| 2016/0148074 | A1* | 5/2016 | Jean ..................... G06V 10/462 |
| | | | 382/190 |
| 2016/0179945 | A1* | 6/2016 | Lastra Diaz .......... G06F 16/284 |
| | | | 707/739 |
| 2016/0224892 | A1 | 8/2016 | Sawada et al. |
| 2016/0283483 | A1* | 9/2016 | Jiang ................... G06F 16/2246 |
| 2017/0011306 | A1 | 1/2017 | Kim et al. |
| 2017/0061250 | A1* | 3/2017 | Gao ........................ G06V 20/70 |
| 2017/0109615 | A1* | 4/2017 | Yatziv ............... G06F 18/24323 |
| 2018/0097763 | A1* | 4/2018 | Garcia .................... G06Q 50/01 |
| 2019/0080207 | A1* | 3/2019 | Chang .................. G06F 16/7837 |
| 2019/0122120 | A1* | 4/2019 | Wu ......................... G06N 3/084 |
| 2019/0164086 | A1* | 5/2019 | Amit .................... H04L 63/1416 |
| 2019/0164211 | A1* | 5/2019 | Andrew ................. G06N 20/00 |
| 2019/0379624 | A1* | 12/2019 | Garcia ................... G06Q 30/06 |
| 2020/0012895 | A1* | 1/2020 | Zhao ..................... G06N 3/0454 |
| 2020/0012904 | A1* | 1/2020 | Zhao ..................... G06V 20/20 |
| 2020/0073953 | A1* | 3/2020 | Kulkarni ................ G06N 3/084 |
| 2020/0242400 | A1* | 7/2020 | Perkins ................ G06V 10/776 |
| 2020/0321101 | A1* | 10/2020 | Karargyris ........... G06K 9/6262 |
| 2021/0209289 | A1* | 7/2021 | Kandur Raja ........ G06F 40/109 |

FOREIGN PATENT DOCUMENTS

| | | |
|---|---|---|
| CN | 106991439 A | 7/2017 |
| CN | 104680178 B | 11/2017 |
| CN | 108764286 A | 11/2018 |
| WO | 2015019364 A2 | 2/2015 |
| WO | 2017100970 A1 | 6/2017 |

OTHER PUBLICATIONS

Shao, Bin, Haixun Wang, and Yatao Li. "The trinity graph engine." Microsoft Research 54 (2012): 4. pp. 1-42.

Hakkani-Tür, Dilek, Larry Heck, and Gokhan Tur. "Using a knowledge graph and query click logs for unsupervised learning of relation detection." 2013 IEEE International Conference on Acoustics, Speech and Signal Processing. IEEE, 2013. pp. 1-5.

Hakkani-Tür, Ollek, et al. "Probabilistic enrichment of knowledge graph entities for relation detection in conversational understanding." Proceedings of Interspeech. 2014. pp. 1-5.

Mitchell, Tom, et al. "Never-ending learning." Communications of the ACM 61.5 (2018): 103-115.

Esteban, Cristóbal, et al. "Predicting the co-evolution of event and knowledge graphs." 2016 19th International Conference on Information Fusion (Fusion). IEEE, 2016. pp. 1-16.

Quattoni, Ariadna, Michael Collins, and Trevor Darrell. "Transfer learning for image classification with sparse prototype representations." 2008 IEEE Conference on Computer Vision and Pattern Recognition. IEEE, 2008 pp. 1-10.

Raina, Rajat, et al. "Self-taught learning: transfer learning from unlabeled data." Proceedings of the 24th international conference on Machine learning. 2007 pp. 1-4 [Abstract Only].

Zhu, Yin, et al. "Heterogeneous transfer learning for image classification." Twenty-fifth aaal conference on artificial intelligence. 2011 pp. 1-6.

* cited by examiner

RANKING IMAGE SOURCES FOR TRANSFER LEARNING

BACKGROUND

The present disclosure relates to processing images using image data and other classifying information to sort, refine, and rank large image data collections for transfer learning.

Transfer learning uses data source classifiers trained from large bodies of data to classify data such as image data with high precision. Some approaches for selecting transfer models estimate transfer performance at the level of large conceptual categories. However, large labeled data sets contain deep hierarchies that are not represented when estimating the performance level of a particular model of transfer learning.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method including: receiving an image from an image source, extracting a plurality of image tags from the image, selecting an image tag from the plurality of image tags, querying a word embedding database for a set of associated terms for the selected image tag, querying a knowledge database for a parent term for each associated term in the set of associated terms, updating a base model set based on query results from the knowledge database, and ranking a final set of base models from the base model set. Other embodiments of this aspect include corresponding computer systems, apparatus, and computer programs recorded on one or more computer storage devices, each configured to perform the actions of the methods.

One embodiment includes a system including: one or more computer processors, and a memory containing a program which when executed by the computer processors performs an operation including: receiving an image from an image source, extracting a plurality of image tags from the image, selecting an image tag from the plurality of image tags, querying a word embedding database for a set of associated terms for the selected image tag, querying a knowledge database for a parent term for each associated term in the set of associated terms, updating a base model set based on query results from the knowledge database, and ranking a final set of base models from the base model set.

One embodiment aspect includes a computer program product including: a computer-readable storage medium having computer-readable program code embodied therewith, the computer-readable program code executable by one or more computer processors to perform an operation including: receiving an image from an image source; extracting a plurality of image tags from the image; selecting an image tag from the plurality of image tags; querying a word embedding database for a set of associated terms for the selected image tag; querying a knowledge database for a parent term for each associated term in the set of associated terms; updating a base model set based on query results from the knowledge database; and ranking a final set of base models from the base model set.

DETAILED DESCRIPTION

Figure 1:
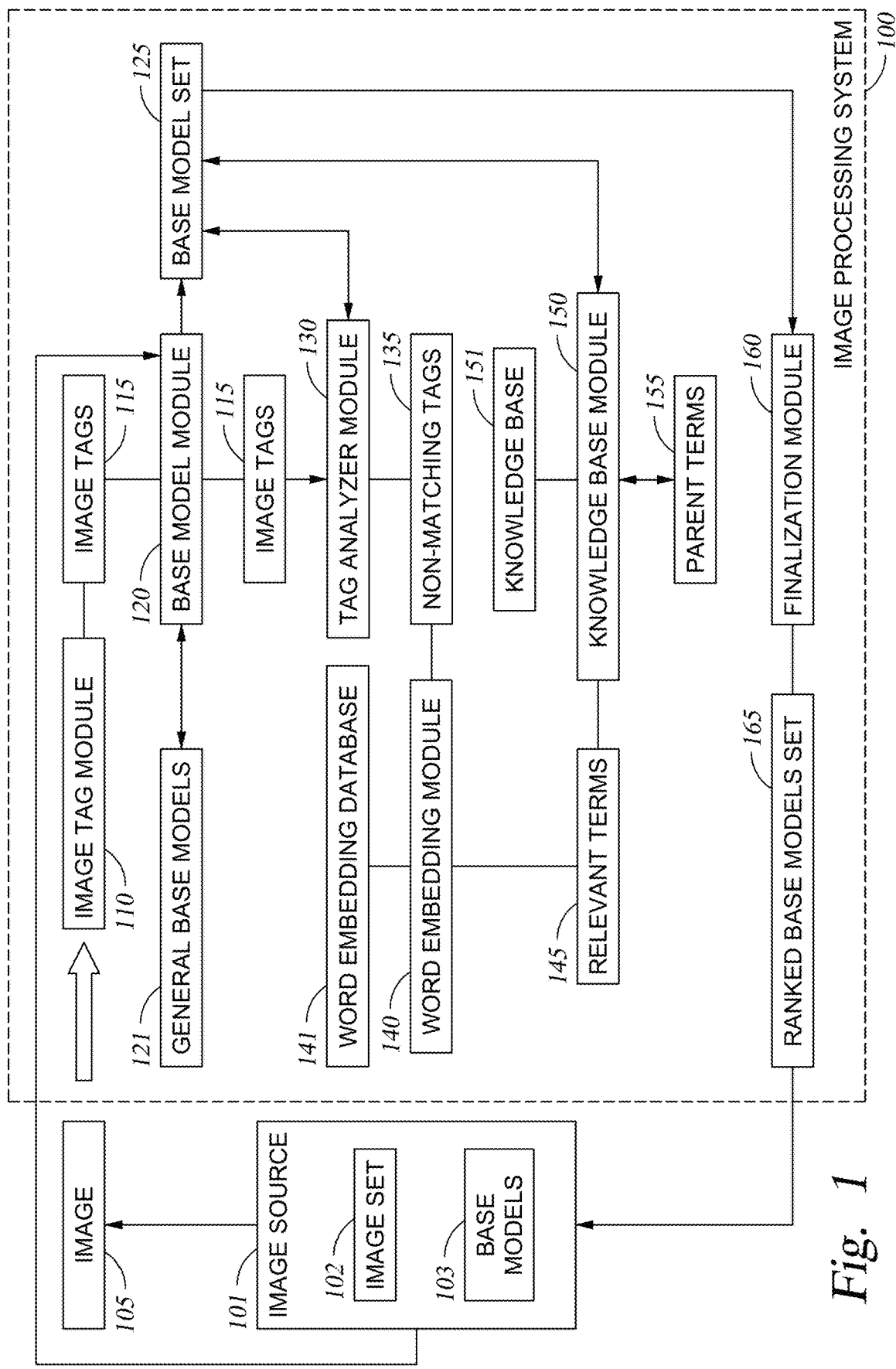
FIG. 1 is a system flow diagram for an image processing system, according to one embodiment.

In modern technological environments, large amounts of data are continuously created by both human actions and machine actions. These large amounts of data are often difficult to manually sort, examine, and utilize for any purpose. Some solutions to the utilization problem for data includes the advent of various tools that process, analyze, and sort the data such that it can be used for a variety of purposes. These tools include a wide variety of machine learning (ML) models such as neural networks, among others.

These ML tools are often continually trained with specific datasets, used for certain purposes, and then refined/retrained using additional datasets and models to improve performance. The process of training, refining, and improving ML models also uses large amounts of data. However, it is often difficult to identify what data or datasets should be used to efficiently train various ML models. For example, using a random image dataset to train an image based ML model may or may not improve or refine the ML model. To avoid wasting computing resources and time, developers of the ML models use transfer learning, where known datasets are used to train base ML models. Transfer learning helps by leveraging existing trained models/domains of data from large corpuses/datasets to improve precision in models trained from smaller datasets.

For example, an ML developer with several ML base models that are trained on large datasets can utilize transfer learning to improve the accuracy of a target ML model. In some examples, the ML developer may feed random sets of images to the base model or initialize its weights randomly, but this likely would not improve the target model. For example, using a model trained on fruits as the basis to further train it to recognize buildings may not improve the precision related to identifying buildings compared to random initialization. A more appropriate source dataset for transfer learning would include an image dataset that contains images related to buildings, structures, etc. However, not all image datasets, trained or otherwise, come with a detailed level of categorical information. This lack of insight into the image datasets can leave an ML developer again struggling to determine whether training a base model with a given image dataset is useful.

Moreover, some large labeled or trained datasets may not contain information that accurately represents the deep hierarchies shown in the dataset. For example, an image data set may include an "animal" label but include deeper hierarchies not fully represented by the label such as: mammal>cat>cheetah. Identifying crucial sub-features in the deeper hierarchies can assist in selecting more specific source categories and in developing more efficient source models and transfer techniques.

The system and methods described herein provide techniques for processing a given image dataset and providing a recommendation for, or ranking of, associated ML base models based on the detailed review of the feature space of the images as described herein. The embodiments herein utilize image tags extracted from image data to determine which categories would be the most semantically relevant sources for the given image datasets. This determination is accomplished by first expanding the image tags using a distributional model such as a word embedding model and associating the expanded terms with a large knowledge base to determine various categories associated with the expanded terms. These categories are used to score and rank various ML models that may be improved using the given image dataset.

FIG. 1 is a system flow diagram for an image processing system, system 100, according to one embodiment. The system 100 includes various modules and datasets to determine an appropriate base model and/or ranking of base models for a given target dataset including various images. The system 100 receives an image 105 from an image source 101. The image source 101 may be maintained or provided by a user, an ML developer, etc. In some examples, the image source 101 provides an image 105 from an image dataset such as image set 102. The image source 101 may provide the image 105 individually or as part of the image set 102 to the system 100. Additionally, the image set 102 may include multiple image sets (e.g., multiple discrete image sets) for analysis by the system 100.

In some examples, the image set 102 includes multiple images which are related. For example, the image set 102, including the image 105, may be a component of an ML trained image dataset where the image dataset provides additional training and refinement to an ML base model. In this example, the image set 102 includes a categorical label which describes the image content of the image set 102 in a broad manner. In another example, the image set 102 may be a dataset which includes unknown, random, or semi-random images. In both examples, the ML developer or image source 101 desires to know which ML base models would benefit from being trained using the image set 102 and which base models would experience less benefit from training using the image set 102.

As described above, in some examples, the image source 101 provides the images in the image set 102 to the system 100 individually (e.g., one at a time). The image source 101 may also provide the image set 102 in its entirety to the system 100. In both cases, the system 100 processes each image in the image data received from the image source 101 as described herein. The image source 101 may also designate a set of images external to the image source 101 as the image set 102. For example, a repository of images accessible via the internet may be designated as the image set 102. In this example, the image source 101 and/or the system 100 retrieves the image 105 from the external set of images for processing by the system 100.

The image tag module receives the image 105 or the image set 102 and extracts a plurality of image tags from the image. This initial extraction allows the system to begin a process of identifying the image and relating the image to various ML base models. In some examples, the image tag module 110 identifies various objects and other visual properties of an image using image extraction techniques. In some examples, the image tag module 110 utilizes an external image tag extraction service or database (not shown) to determine/extract the various image tags. The image tags may also be determined from metadata and other information associated with the image 105. The image tag module 110 generates the image tags 115 for the image 105 based on the extracted information. In some examples, the image tag module 110 processes an entire image set 102 to produce the image tags 115, where the image tags 115 include the image tags for a plurality of images in the image set 102.

The image tag module 110 provides the image tags 115 to a base models module 120 of the system 100. In some examples, the base models module 120 receives a base model set 103 for analysis from the image source 101. For example, when an ML developer has a set number of identified base models for training, the ML developer provides a discrete set of base models or base model names (e.g., an identification of the base models), the base model set 103, to the system 100 for analysis. The base model module 120 initializes a base model set 125 and an associated counter for each base model in the base model set 125.

In some examples, the base model module 120 determines or selects potential base models from a general base models database 121. For example, the image source 101 may provide only the image set 102 to the system 100 and requests potential base models or a ranked list of base models that may be improved or trained using the image set 102. In this example, the base model module 120 uses the image tags 115 to determine various potential base models from the general base models database 121 and selects the potential base models and associated base names for the base model set 125. Upon selecting potential base models, the base model module 120 initializes the base model set 125 and associated counters for each selected base model in the base model set 125.

The image tag module 110 also provides the image tags 115 (either directly or via the base model module 120) to a tag analyzer module 130 of the system 100. The tag analyzer module 130 of the system 100 first processes the image tags 115 to determine if any of the image tags corresponds to or are associated with a base model in the base model set 125. For example, when an image tag in the image tags 115 includes "car" and the base model set 125 includes a "car" base model, the image tag analyzer module 130 increases a counter for the "car" base model. As the tag analyzer module 130 processes the image tags 115, any image tags in the image tags 115 that are not directly associated with or correspond to a base model in the base model set 125 are provided to a word embedding module 140. In some examples, the tag analyzer module 130 processes the all of the image tags in the image tags 115 for the image 105 or the image set 102 and stores the tags not directly associated with base models in the base model set 125 as non-matching tags 135.

In some examples, the image tag module 110, base model module 120, and tag analyzer module 130 processes an entire set of image data for the image set 102 prior to processing via the word embedding module 140 and other components of the system 100. In this example, at the end of the processing of the image set 102, non-matching tags 135 include all non-matching tags for the image set 102 and various counters associated with the base model set 125 have been increased for any image tags that matched the base models.

The word embedding module 140 uses the non-matching tags provided from the tag analyzer module 130 and/or stored in the non-matching tags 135 to expand a base of related terms. The expansion of the related terms for each image tags captures potential related terms which are used by the system 100 to increase the accuracy and relevance of the ranking of the various base models as well as capturing any deeper hierarchies present in the image 105 as part of the image set 102. In some examples, the word embedding module 140 produces the related terms using a word embedding ML language model, such as word2vec, with access to the word embedding database 141. The word embedding module 140 builds the model from the database 141 by training out of large word sources such as a publicly available dataset accessible via the internet or via domain specific web crawls to improve the coverage and maximize the probability of finding the image tags in a vector space model.

The word embedding module 140 produces a set of relevant terms 145 for each of the image tags in the non-matching tags 135. For example, for a "sedan" image tag the word embedding module 140 produces related terms such as "vehicle", "automobile", "car," and "chair". In some examples, the word embedding module 140 uses a two-layer neural network via the word embedding database 141 to produce a vector space for the image tag which often includes many related terms. The vector space results are used to determine a subset of most relevant words. The most relevant words are determined using pattern recognition algorithms, such as a k-nearest neighbors (k-NN) algorithm. The k-NN algorithm is applied to word vectors produced from the vector space for the image tag and identifies a set number "k" of the most related terms. For example, the image tag sedan produces the subset of most related terms: "vehicle", "automobile", "car," and "chair" as the relevant terms 145. The relevant terms 145 are provided to a knowledge base module 150.

The knowledge base module 150 uses the relevant terms 145 to determine related parent or categorical terms and update base model counters in the base model set 125 for the relevant terms 145. The knowledge base module 150 uses the knowledge base 151 (e.g., a large knowledge graph) to determine next level parent terms for the relevant terms 145. For example, the relevant term "car" has a parent term "automobile." In some examples, the knowledge base module 150 checks the base model set 125 for the relevant terms and the parent terms to determine if the base model set 125 includes the various relevant or parent term. If the term is included in the base model set 125, the counter for the term is increased. If the term is not included, the knowledge base module 150 determines if a next level parent term is included in the knowledge base. For example, when "automobile" is not include in the base model set 125, the knowledge base module 150 determines from the knowledge base 151, the parent term "vehicle." When the next level parent term is included in the base model set 125, the counter is increased. In an example where, the next level parent term is not included in the base model set 125, the knowledge base module 150 continues to iteratively check the knowledge base 151 until a next level parent term is not found. For example, "vehicle" may include the next level parent terms in order from "machine" to "mechanical structure" where "mechanical structure" includes an indication that the term is a limited parent term, i.e. is no next level parent or the parent term. The knowledge base module 150 does not increase a counter if these terms are not found in the base model set 125.

The system 100 continues to process various images from the image set 102 until every image in the image set 102 is processed. A finalization module 160 processes the base model set 125 to first normalize the counters for the various base models. In some examples, the base model set 125 is normalized using standard statistical normalization methods and algorithms. The finalization module 160 produces the ranked base models set 165 from the normalized base model set 125. In some examples, the ranked base models set 165 includes a subset of the base model set 125 as described herein. The finalization module 160 provides the ranked base models set 165 to the image source 101.

Figure 2:
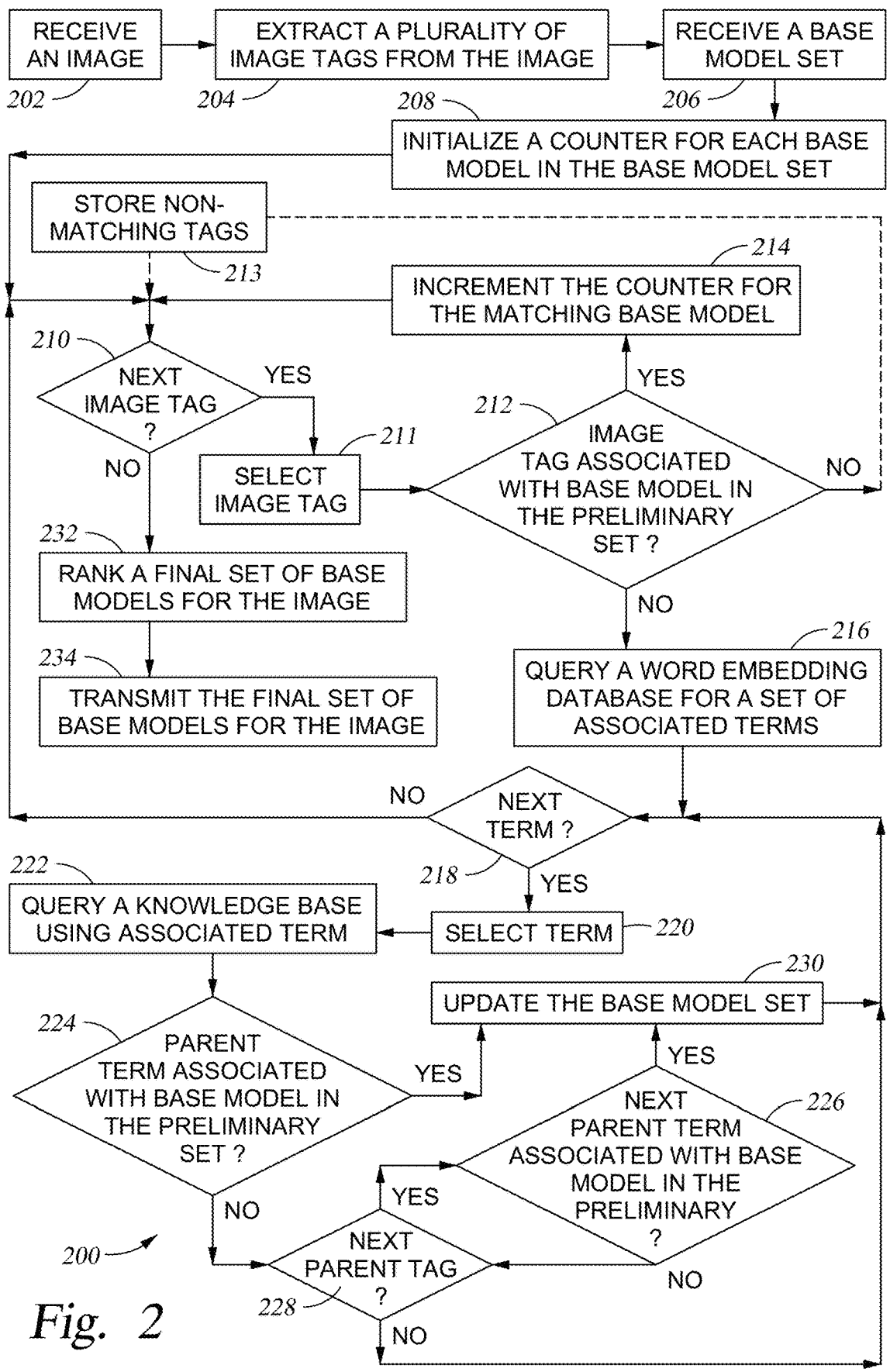
FIG. 2 is a method for ranking base models, according to one embodiment.

FIG. 2 is a method 200 for ranking base models, according to one embodiment. Reference will be made to the various system components described in FIG. 1 as well FIGS. 3A-3E during the discussion of the various steps and blocks of the method 200. Method 200 begins at block 202 where the system 100 receives an image from an image source. For example, the system 100 receives an image 105a depicted in FIG. 3A from the image source 101. In some examples, the image 105a is part of a received image set 102a, received at the system 100 from the image source 101, where the image set includes multiple images such as 105a-n. In some examples, the image 105a and/or the image set 102a includes a request to return a list of ranked base models for transfer training for the image 105a or the image set 102a. In some examples, the system 100 receives an identification of a location for the image 105a or image set 102a and retrieves the image 105a and images 105b-n from a remote location such as a repository accessible via network (e.g., the Internet, etc.).

Figures 3A, 3B, 3C:
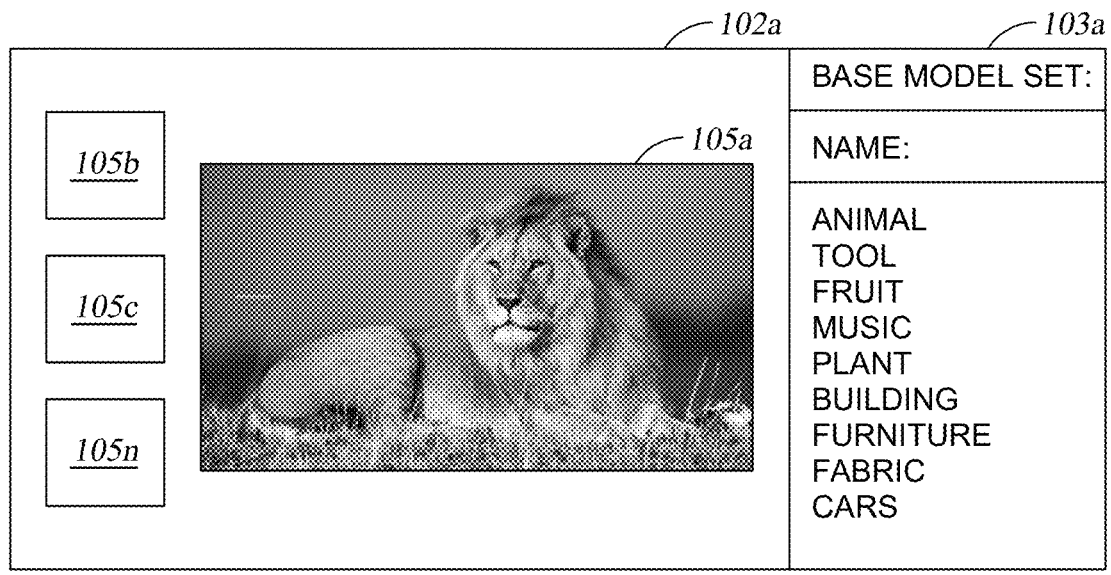
FIG. 3A illustrates an image set, according to one embodiment.
FIG. 3B illustrates an image tag set, according to one embodiment.
FIG. 3C illustrates a matching term set, according to one embodiment.

As shown in FIG. 3A, the image 105a includes a lion in a lying or resting position in grass. In some examples, the image 105a and the images 105b-n are related images in a trained image set, image set 102a, which may include a categorical label such as "nature." In this example, the categorical label describes the images, but does not capture the more detailed information in the images (e.g., animals, plants, etc.). In another example, the image 105a and the images 105b-n are semi-related, random images, or an untrained image set such that a categorical label for the image set 102a is not available. In both examples, the ML developer desires a more granular or precise view of the content of the various images and their relation to various ML base models.

At block 204, the image tag module 110 extracts a plurality of image tags from the image 105a. As described in relation to FIG. 1, the image tag module 110 may utilize an external tag service or process the image 105a (e.g., using image recognition, etc.) to extract and identify various objects depicted in the image and to associate the identified information with various image tags. The extracted tags for the image 105a are stored as image tags 115a as depicted in FIG. 3B. Example image tags extracted from the image 105a include: "lion, animal, sky, grass, and fur."

In some examples, the method continues at block 206 where the base model module 120 receives a base model set from the image source. For example, the base model module 120 receives the base model set 103a from the image source 101. In some examples, the system 100 receives the base model set 103a as a unit with the image set 102a as shown in FIG. 3A. The base models set 103a includes at least an identification of base models, such as a base model names, for ranking from the image source 101.

In some examples, the base model module 120 acquires or selects base models or base model names from the general base models database 121. For example when the image source 101 requests which base models may be trained using the image set 102*a*, but does not provide a set of base models for study, the base model module 120 selects potential related base models from the general base models database 121 based on the image tags 115*a*.

When the base models are received or selected, the base model module 120 initializes a base model set 125*a*, shown in FIG. 3C, for the image 105*a* and/or image set 102*a*, where the base model set 125*a* includes the base models to be ranked by the system 100. At block 208, the base model module 120 initializes a counter for each base model in the base model set. For example, the base model module 120 initializes the base model set 125*a* and counter for each base model in the base model set 125*a* as shown in FIG. 3C. In this example, the base model set 125*a* includes various base models included in the base model set 103*a* received from the image source 101 and includes: "animal, tool, fruit, music, plant, building, furniture, fabric, and cars." In another example, the base model module 120 may select related base models from the general base models database 121 and include them in the base model set 125*a*.

At block 210, the tag analyzer module 130 begins an iterative tag analyzation process by determining if all tags have been analyzed in the image tag set 115*a*. When there is a next tag to be analyzed, the tag analyzer module 130 selects the image tag from the plurality of image tags in image tags set 115*a* at block 211. For example, the tag analyzer module 130 selects a first tag "animal" in the image tag set 115*a*.

At block 212, the tag analyzer module 130 determines a matching associated base model from the base model set. For example, the tag analyzer module 130 compares the selected image tag to the base model names in the image set 125*a*. When the base model set includes a matching base model, the tag analyzer module 130, at block 214, increments the counter for the selected image tag associated base model. For the selected image tag "animal," the tag analyzer module 130 determines that the base model set 125*a* includes the "animal" base model and increases the counter for the "animal" base model. Upon incrementing the counter associated counter, the method 200 returns to block 210 to determine if all tags have been analyzed in the image tag set and select a next image tag. For the image tag set 115*a*, the next image tag is "lion."

The tag analyzer module 130 selects the image tag "lion" from the image tags 115*a* at block 211. At block 212, the tag analyzer module 130 determines that there is not a matching base name in the base model set. For example, the tag analyzer module 130 determines if there is a direct match between the selected image tag "lion" and base model names in the base model 125*a*. In this example, since the base model set 125*a* does not include a base model for "lion" lion is identified or marked as a non-matching tag. In some examples, the tag analyzer module 130 stores any identified non-matching tags as non-matching tags 135 at block 213. In some examples, the tag analyzer module 130 processes all of the tags stored in the image tag set 115*a* through the method steps in blocks 210, 211, 212, 213, and 214 prior to proceeding to block 216. As described above, the system 100 may also process a full image set, such as image set 102*a*, for non-matching tags (e.g., process all of the images in the image set 102*a* through blocks 202, 204, and the process that begins at block 210) and store the non-matching tags for the image set 102*a* as non-matching tags 135. The tag analyzer module 130 provides the non-matching tag or the non-matching tags 135 to the word embedding module 140.

At block 216, the word embedding module 140 queries a word embedding database for a set of associated terms for the non-matching tag or tags. The process described in block 216 is for a single non-matching image tag as determined at block 212. In another example, the non-matching tags 135 are processed as a batch upon completion of the processing of multiple images or image set 102*a*. In this example, each image tag of the plurality of non-matching tags is selected by the word embedding module 140 for processing.

Figure 4:
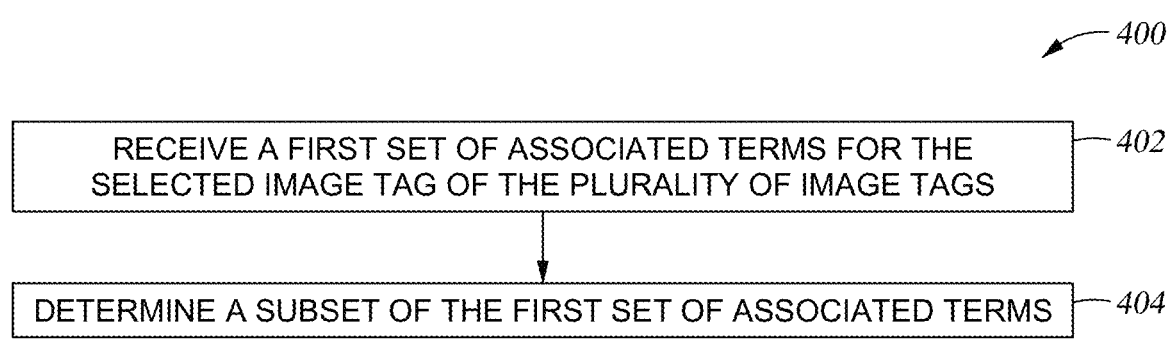
FIG. 4 is a method selecting image tag, according to embodiments described herein.

The word embedding module 140 uses a two-layer neural network and the query returns from word embedding database 141 to produce a vector space of relevant words for the non-matching image tag such as a Word2vec model. For example, as described in relation to method 400 in FIG. 4, the word embedding module 140 receives a first set of associated terms for the selected image tag of the plurality of image tags at block 402. In some examples, the word embedding module builds the vector space for the relevant words using the first set of associated terms and the word embedding database 141.

At block 404, the vector space results are used to determine a subset of most relevant words from the first set of associated terms. For example, the word embedding module 140 processes the vector space results from the neural network and word embedding database 141 to determine a subset of most relevant words to expand the base for terms for the non-matching tags. For example, the non-matching tag "lion" may have many associated terms in the vector space results including terms the: "big cat, feline, carnivore, mammal, zoo, panther, football, Leo, music," etc.

In some examples, the most relevant words are determined using pattern recognition algorithm such as the k-NN algorithm applied to the vector space results for the associated terms. For example, the k-NN algorithm is applied to word vectors for "lion" produced from the vector space for the image tag lion by the word embedding module 140 and identifies a set number of relevant terms, such as the five most relevant terms. For "lion", the five most related terms include the relevant terms shown in relevant terms 145*a* of FIG. 3D, including: "big cat, feline, carnivore, mammal, and zoo." The word embedding module 140 provides the relevant terms 145*a* to the knowledge base module 150.

At block 218, the knowledge base module 150 begins an iterative process to use a knowledge database to process the relevant terms queried from a word embedding database at block 216 and to update the counters in the base model set 125*a* using categorical or parent terms from the knowledge database.

At block 218, the knowledge determines if there are an unprocessed terms in the relevant terms 145*a* (e.g., a next term). When the relevant terms 145*a* include unprocessed terms, the knowledge base module 150 selects a term in the relevant terms 145*a* at block 220 and queries a knowledge database for one or more parent or categorical terms for the selected relevant term from the relevant terms 145*a* at block 222. For example, the selected big cat term returns various related entities in the knowledge base including: "Panthera, tiger, lion, jaguar, leopard, and snow leopard." The parent term for these entities includes "felidae" as determined by the knowledge module 150 using the knowledge base 151.

At block 224 the knowledge base module 150 determines if there is a matching base model for the parent term, the knowledge base module 150 updates the base model set at block 230 by incrementing the counter for the associated base model for the parent term. In another example, the knowledge base module 150 compares "felidae" with the base names in the base model set 125a and determines that there is not a matching or directly associated base model in the base model set 125a.

Upon determining there is not a match, the knowledge base module 150 determines at block 228 if there is a next parent term from the knowledge base, e.g. "mammal." The next parent term is compared to the base model set 125 for a match at block 226. Upon determining that there is not a match at block 226, the method 200 returns to block 226 where the knowledge base module 150 determines there is a next parent, e.g., "animal." In this iteration, the module 150 determines there is a match for the next parent "animal," and the knowledge base module 150 updates the base model set at block 230 by incrementing the counter for the associated base model for the parent. For example, the counter for the "animal" base model is incremented.

In an example, where there the next parent term does not match a base model in the base model set at block 228 and there is no next parent term in the knowledge base according to the knowledge base module 150, the method 200 returns to block 218 to process a next relevant term in the relevant terms 145a.

In an example where the knowledge base module 150 determines at block 218 that there are no further terms to be examined in the knowledge base, the method 200 returns to block 210 and proceeds to the next image tag in the image tag set 115a. If all image tags in the image tags 115a have been marked as processed, method 200 proceeds to block 232 where the finalization module 160 normalizes the counters in the base model set 125. For example, the finalization module 160 applies stand normalization algorithms to the counters associated with the base models set 125a. In some examples, the normalization process allows for the finalization module 160 to better rank the base models in the base model set.

Figures 3D, 3E:
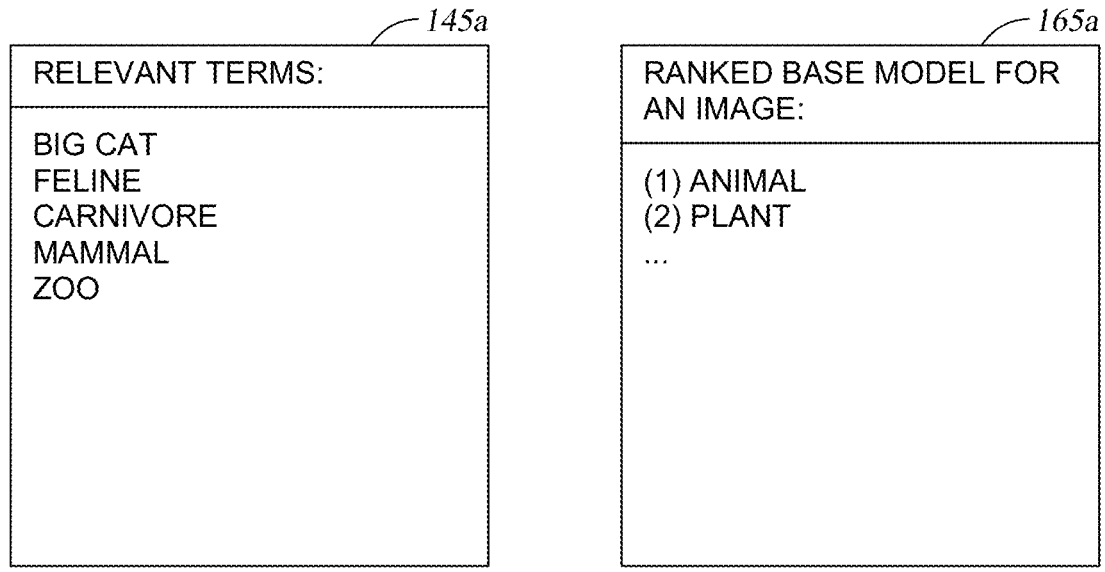
FIG. 3D illustrates a base model set, according to one embodiment.
FIG. 3E illustrates a final base model set, according to one embodiment.

At block 232, the finalization module 160 ranks a final set of base models from the base model set. In some examples, the finalization module 160 ranks the final set base on the normalized counters in the base model set 125a. In some examples, the final set of base models includes a subset of the most relevant base models that may be improved by the image 105a or the image set 102. For example, a ranked base model 165a for the image 105a or image set 102 may include only the "animal" base model ranked first and the "plant" base model ranked second as shown in FIG. 3E. In another example, the ranked base model 165a includes all of the base models from the base model set 125a. At block 234, the finalization module 160 transmits the final set of base models to the image source. For example, the ranked base model 165a is transmitted to the image source 101. In this example, the ranked base model 165a indicates to the image source 101, that the "nature" image set 102a may be suited to trained "animal" and "plant" base models and is less likely to efficiently train the other ML models in the base model set 103a including the "fruit" base model even though "fruit" may fall under the broad category of nature.

Figure 5:
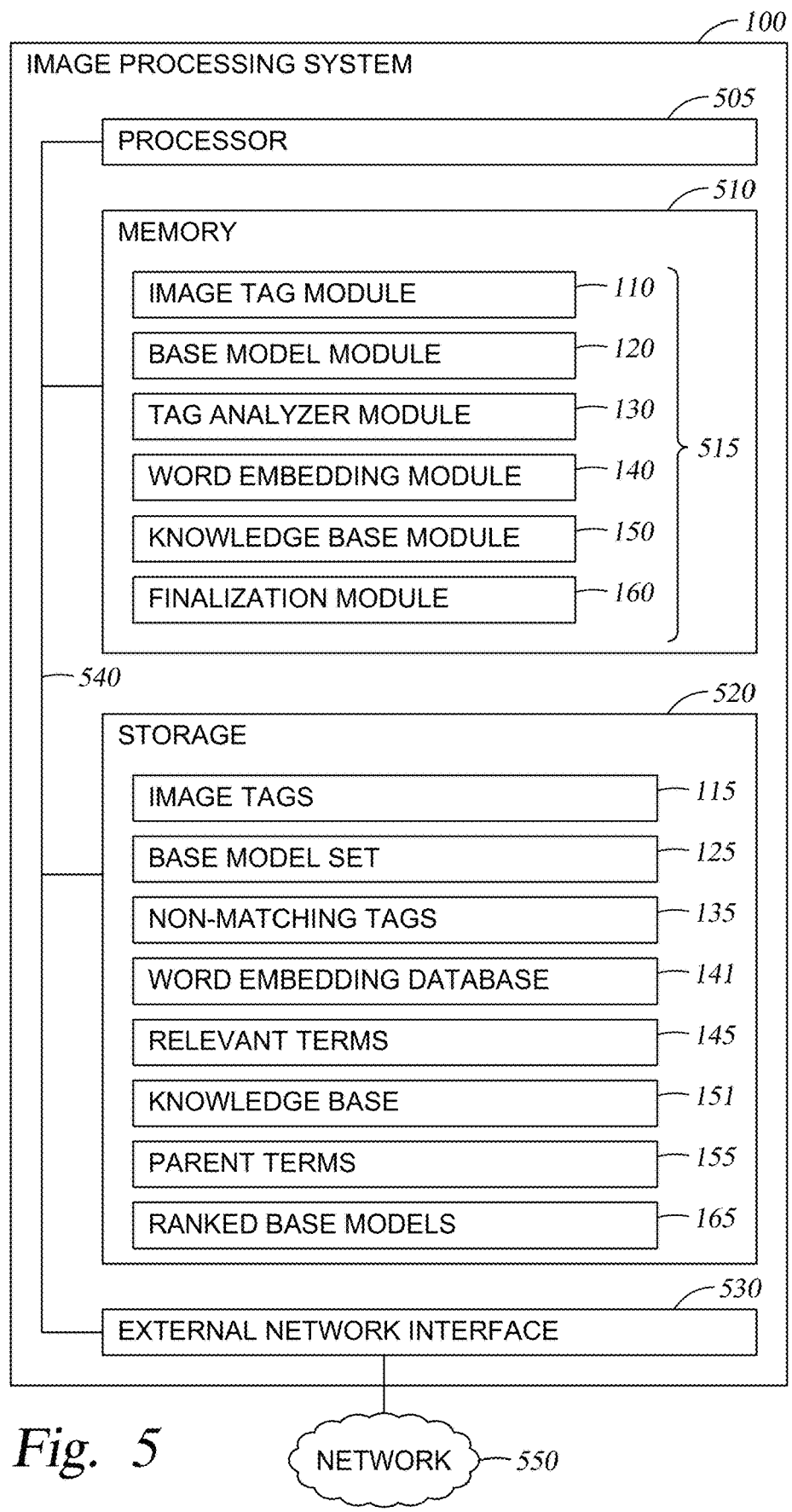
FIG. 5 illustrates a block diagram of an image processing system, according to one embodiment.

FIG. 5 illustrates a block diagram of an image processing system, system 100, according to one embodiment. The arrangement may include a general purposed computer embodied as the system 100 and configured to perform the methods described herein. The components of system 100 may include, but are not limited to, one or more processing units, or processor 505, a system memory, memory 510, a storage system, storage 520, external network interface 530, and a bus 540 that couples various system components including the system memory, memory 510 and storage system, storage 520, to processors 205 along with the external network interface 530 and various input/output components and a network 550. In other embodiments, the system 100 is distributed and includes a plurality of discrete computing devices that are connected through wired or wireless networking.

Bus 540 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

System 100 typically includes a variety of computer system readable media. Such media may be any available media that is accessible by system 100, and it includes both volatile and non-volatile media, removable and non-removable media.

System memory 310 can include computer system readable media in the form of volatile memory, such as random access memory (RAM) and/or cache memory. System 100 may further include other removable/non-removable, volatile/non-volatile computer system storage media. In some examples, storage 520 may be included as part of memory 510 and may typically provide a non-volatile memory for the networked computing devices, and may include one or more different storage elements such as Flash memory, a hard disk drive, a solid state drive, an optical storage device, and/or a magnetic storage device. For example, storage system, storage 520, can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 540 by one or more data media interfaces. Storage 520 may include media for storing the image tags 115, the base model set 125, the non-matching tags 135, the word embedding database 141, the relevant terms 145, the knowledge base 151, the parent terms 155, and the ranked base models set 165.

Memory 510 may include a plurality of program modules 515 for performing various functions related to system 100 described herein. The program modules 515 generally include program code that is executable by one or more of the processor 505. As shown, program modules 515 include the various modules discussed in relation to FIG. 1 including the image tag module 110, the base model module 120, the tag analyzer module 130, the word embedding module 140, the knowledge base module 150, and the finalization module 160. The program modules 515 may also interact with each other and storage system, storage 520, to perform certain functions as described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the image processing system, system 100) or related data available in the cloud. For example, the various modules of the system 100 execute on a computing system in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method comprising:
   receiving an image from an image source;
   extracting a plurality of image tags from the image;
   receiving, from a model database, identification of base models of a base model set comprising a plurality of machine learning models;
   identifying, from the identification, a plurality of terms comprising, for each respective machine learning model of the base models in the base model set, a respective set of one or more terms associated with the respective machine learning model;
   initializing a counter for each base model in the base model set;
   selecting a subset of non-matching image tags from the plurality of image tags, wherein each respective image tag in the subset of non-matching image tags is not present in the plurality of terms and is not present in the sets of the one or more terms associated with the machine learning models of the base models;
   identifying a set of associated terms for a first tag in the subset of non-matching tags by processing the first tag using an embedding machine learning model, wherein the set of associated terms comprises an expanded base of related word terms for the first tag;
   querying a knowledge database to determine a set of parent terms for the set of associated terms;
   updating the associated counters for one or more base models of the base model set based on query results from the knowledge database, comprising determining whether each parent term of the set of parent terms are present in the plurality of terms; and
   ranking the base models of the updated base model set based on the plurality of image tags, the query results, the plurality of terms, and the associated base model counters, wherein the ranking indicates relevance of each of the base models with respect to the image.

2. The method of claim 1, further comprising receiving the base model set from the image source.

3. The method of claim 2, further comprising:
   prior to using the embedding machine learning model, determining a matching associated base model from the base model set for a second tag of the plurality of image tags;
   incrementing a counter for the matching associated base model; and
   selecting a next image tag from the plurality of image tags.

4. The method of claim 2, wherein identifying the set of associated terms further comprises:
   receiving a first set of associated terms for the first tag;
   determining a subset of the set of associated terms; and
   wherein querying the knowledge database comprises:
      selecting a first term from the set of associated terms;
      querying the knowledge database using the first term; and
      incrementing a counter for a first term associated base model in the base model set when a query to the knowledge database returns a parent term directly associated with the first term associated base model.

5. The method of claim 4, further comprising:
   when a parent term is not directly associated with a base model in the base model set, determining a next parent term from the knowledge database; and
   incrementing a counter for a second term associated base model in the base model set when a query to the knowledge database returns a next parent term directly associated with the second term associated base model.

6. The method of claim 4, further comprising:
   upon determining that a parent term is not directly associated with a base model in base model set, determining a next parent term from the knowledge database;
   determining that the next parent term is not directly associated with a base model in the base model set;

determining from the knowledge database the next parent term is a limited parent term; and selecting a next term in the first set of associated terms.

7. The method of claim 1, wherein ranking the base models further comprises:
determining a rank for each of the base models based on associated base model counters; and
transmitting the base models to the image source.

8. A system comprising:
one or more computer processors; and
a memory containing a program which when executed by the computer processors performs an operation comprising:
receiving an image from an image source;
extracting a plurality of image tags from the image;
receiving, from a model database, identification of base models of a base model set comprising a plurality of machine learning models;
identifying, from the identification, a plurality of terms comprising, for each respective machine learning model of the base models in the base model set, a respective set of one or more terms associated with the respective machine learning model;
selecting a subset of non-matching image tags from the plurality of image tags, wherein each respective image tag in the subset of non-matching image tags is not present in the plurality of terms and is not present in the sets of the one or more terms associated with the machine learning models of the base models;
identifying a set of associated terms for a first tag in the subset of non-matching tags by processing the first tag using an embedding machine learning model, wherein the set of associated terms comprises an expanded base of related word terms for the first tag;
querying a knowledge database to determine a set of parent terms for the set of associated terms;
updating the base model set based on query results from the knowledge database, comprising determining whether each parent term of the set of parent terms are present in the plurality of terms;
ranking the base models of the updated base model set based on the plurality of image tags, the query results, and the plurality of terms, wherein the ranking indicates relevance of each of the base models with respect to the image; and
further training, using the image as training data, a first ranked model of the updated base model set.

9. The system of claim 8, further comprising:
receiving the base model set from the image source; and
initializing a counter for each base model in the base model set.

10. The system of claim 9, further comprising:
prior to using the embedding machine learning model, determining a matching associated base model from the base model set for a second tag of the plurality of image tags;
incrementing a counter for the matching associated base model; and
selecting a next image tag from the plurality of image tags.

11. The system of claim 9, wherein identifying the set of associated terms further comprises:
receiving a first set of associated terms for the first tag;
determining a subset of the first set of associated terms; and wherein querying the knowledge database comprises:
selecting a first term from the first set of associated terms;
querying the knowledge database using the first term; and
incrementing a counter for a first term associated base model in the base model set when a query to the knowledge database returns a parent term directly associated with the first term associated base model.

12. The system of claim 11, further comprising:
when a parent term is not directly associated with a base model in the base model set, determining a next parent term from the knowledge database; and
incrementing a counter for a second term associated base model in the base model set when a query to the knowledge database returns a next parent term directly associated with the second term associated base model.

13. The system of claim 11, further comprising:
upon determining that a parent term is not directly associated with a base model in the base model set, determining a next parent term from the knowledge database;
determining that the next parent term is not directly associated with a base model in the base model set;
determining from the knowledge database the next parent term is a limited parent term; and
selecting a next term in the first set of associated terms.

14. The system of claim 8, wherein ranking the base models further comprises:
determining a rank for each of the base models based on associated base model counters; and
transmitting the base models to the image source.

15. A computer program product comprising:
a computer-readable storage medium having computer-readable program code embodied therewith, the computer-readable program code executable by one or more computer processors to perform an operation comprising:
receiving an image from an image source;
extracting a plurality of image tags from the image;
receiving, from a model database, identification of base models of a base model set comprising a plurality of machine learning models;
identifying, from the identification, a plurality of terms comprising, for each respective machine learning model of the base models in the base model set, a respective set of one or more terms associated with the respective machine learning model;
initializing a counter for each base model in the base model set;
selecting a subset of non-matching image tags from the plurality of image tags, wherein each respective image tag in the subset of non-matching image tags is not present in the plurality of terms and is not present in the sets of the one or more terms associated with the machine learning models of the base models;
identifying a set of associated terms for a first tag in the subset of non-matching tags by processing the first tag using an embedding machine learning model, wherein the set of associated terms comprises an expanded base of related word terms for the first tag;
querying a knowledge database to determine a set of parent terms for the set of associated terms;
updating the associated counters for one or more base models of the base model set based on query results from the knowledge database, comprising determining whether each parent term of the set of parent terms are present in the plurality of terms; and ranking the base models of the updated base model set based on the plurality of image tags, the query results, the plurality of terms, and the associated base model counters, wherein the ranking indicates relevance of each of the base models with respect to the image.

16. The computer program product of claim 15, further comprising receiving the base model set from the image source.

17. The computer program product of claim 16, further comprising:

prior to using the embedding machine learning model, determining a matching associated base model from the base model set for a second tag of the plurality of image tags;

incrementing a counter for the matching associated base model; and selecting a next image tag from the plurality of image tags.

18. The computer program product of claim 17, wherein identifying the set of associated terms further comprises:

receiving a first set of associated terms for the first tag;

determining a subset of the first set of associated terms; and wherein querying the knowledge database comprises:

selecting a first term from the first set of associated terms;

querying the knowledge database using the first term; and incrementing a counter for a first term associated base model in the base model set when a query to the knowledge database returns a parent term directly associated with the first term associated base model.

19. The computer program product of claim 18, further comprising:

when a parent term is not directly associated with a base model in the base model set, determining a next parent term from the knowledge database; and incrementing a counter for a second term associated base model in the base model set when a query to the knowledge database returns a next parent term directly associated with the second term associated base model.

20. The computer program product of claim 18, further comprising:

upon determining that a parent term is not directly associated with a base model in base model set, determining a next parent term from the knowledge database;

determining that the next parent term is not directly associated with a base model in the base model set;

determining from the knowledge database the next parent term is a limited parent term; and selecting a next term in the first set of associated terms.

* * * * *